(12) United States Patent
Uhl et al.

(10) Patent No.: US 9,911,017 B2
(45) Date of Patent: Mar. 6, 2018

(54) INTEGRATED RFID ANTENNA FABRICATION METHOD AND APPARATUS FOR TRANSPONDER ASSEMBLY

(71) Applicant: SMARTRAC IP B.V., Amsterdam (NL)

(72) Inventors: Christian Peter Uhl, Stuttgart (DE); Birektawit Waktola, Port Charlotte, FL (US); Ray Freeman, Mesa, AZ (US)

( * ) Notice: Subject to any disclaimer, the term of this patent is extended or adjusted under 35 U.S.C. 154(b) by 18 days.

(21) Appl. No.: 15/093,760

(22) Filed: Apr. 8, 2016

(65) Prior Publication Data

US 2016/0321479 A1    Nov. 3, 2016

Related U.S. Application Data

(60) Provisional application No. 62/144,997, filed on Apr. 9, 2015.

(51) Int. Cl.
*G06K 7/10* (2006.01)

(52) U.S. Cl.
CPC ..... *G06K 7/10356* (2013.01); *G06K 7/10336* (2013.01); *G06K 7/10346* (2013.01); *G06K 7/10207* (2013.01)

(58) Field of Classification Search
CPC .......... G06K 7/10356; G06K 7/10346; G06K 7/10336; G06K 7/10207; G06K 19/0723; G06K 19/07745; G06K 19/07775; G06K 19/07773; H01F 38/14
USPC ............................ 340/10.1; 235/492; 438/26
See application file for complete search history.

(56) References Cited

U.S. PATENT DOCUMENTS

| | | | |
|---|---|---|---|
| 8,201,748 B2 * | 6/2012 | Koepp ............... | G06K 19/0723 235/472.02 |
| 9,053,400 B2 * | 6/2015 | Diorio ................ | G06K 19/0723 |
| 9,633,302 B1 * | 4/2017 | Heinrich .......... | G06K 19/07754 |

* cited by examiner

*Primary Examiner* — Ali Neyzari
(74) *Attorney, Agent, or Firm* — patent2ip LLC

(57) ABSTRACT

This invention presents an improved RFID method, system or apparatus which includes integrating one or more RFID elements or devices in an object, placing one or more RFID elements or devices on an object, and providing a smart placer which determines and places the RFID in the most efficient location in respect to interference, attenuation or frequency shifts that may exist, to improve the performance or efficiency of the RFID transponder and reader system ability.

19 Claims, 17 Drawing Sheets

Adjusting a position of a first component of an RFID transponder with respect to a second component of the RFID transponder to optimize a response characteristic of the RFID transponder, wherein one of the first component and the second component is attached to a package
500

*FIG. 5A*

Forming a first portion of an antenna on a package
520

Forming a second portion of the antenna, wherein the second portion of the antenna is coupled to an RFID chip
530

Positioning the second portion on the package in a vicinity of the first portion
540

Adjusting a position of the second portion with respect to the first portion to improve a response of the antenna
550

*FIG. 5B*

Attaching a first portion of an RFID transponder to a package, wherein the package comprises a second portion of the RFID transponder, wherein the first and second portions form a complete RFID transponder, therein the complete RFID transponder is configured to have a response with an RFID reader at an optimum power setting
1000

*FIG. 10A*

Selecting a power setting for an RFID reader
1020

Moving a first portion of an RFID transponder with respect to a second portion of the RFID transponder, wherein the second portion is attached to a package
1030

Identifying an area in which the RFID reader has communication with the RFID transponder
1040

Lowering the power setting and repeating identifying
1050

Attaching the first portion to the package in an area having lowest power setting
1060

*FIG. 10B*

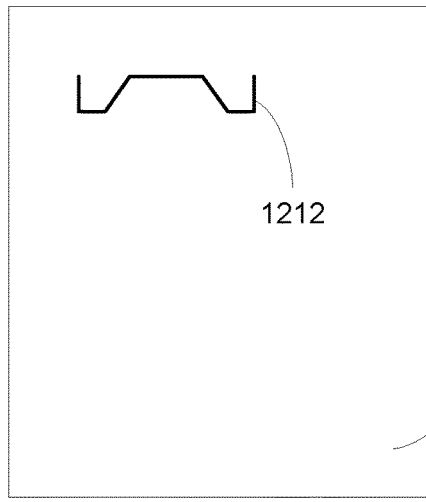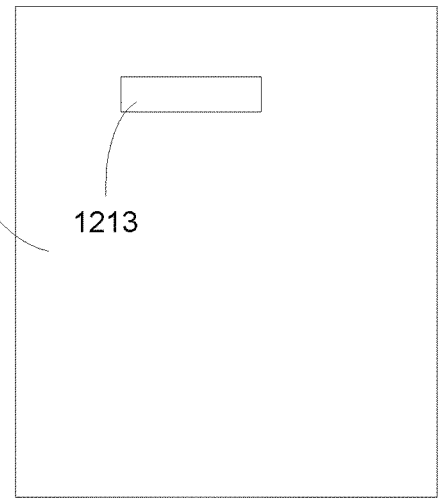
FIG. 12A  FIG. 12B
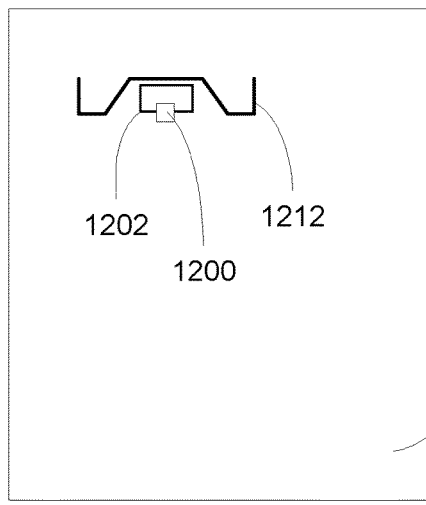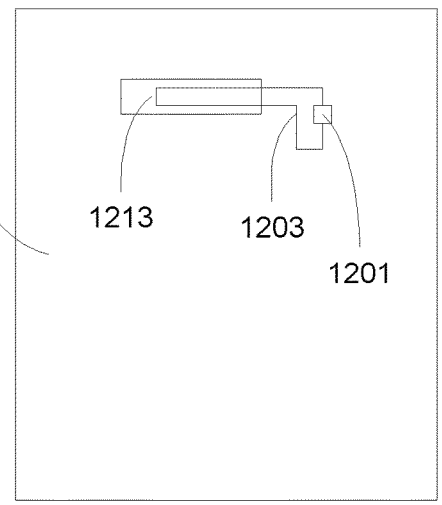
FIG. 12C  FIG. 12D

Forming a first portion of an RFID transponder to multiple packages, wherein the multiple packages have different effects on the RFID transponder
1400

Reducing the different effects by adjusting positions of a second portion of the RFID transponder on the multiple packages
1410

*FIG. 14A*

Classifying packaging materials into multiple groups
1430

Forming different antenna portions on each group
1440

Tuning remaining portions of the RFID transponders to each package in a same group
1450

*FIG. 14B*

INTEGRATED RFID ANTENNA FABRICATION METHOD AND APPARATUS FOR TRANSPONDER ASSEMBLY

This application claims priority from provisional patent application Ser. No. 62/144,997, filed on Apr. 9, 2015, entitled "Integrated RFID Antenna Fabrication Method and Apparatus for Transponder Assembly", which applications are incorporated herein by reference in their entirety for all purposes.

FIELD OF TECHNOLOGY

This disclosure relates generally to RFID antennas and fabrication methods including relating generally to passive (battery less) radio frequency identification (RFID) transponders which contain a radio element, logic, and (typically) digital memory that can be read, sometimes written, and sometimes rewritten that can communicate with a corresponding RFID reader.

In one example embodiment to an improved method, system or apparatus which includes integrating one or more RFID elements or devices on in an object to improve the performance or efficiency of the RFID transponder and reader system ability.

BACKGROUND

Radio frequency identification (RFID) transponders (or tags) can be used to track materials, for example, during shipping and storage. In an RFID tag interrogation process, an RFID reader can generate an electromagnetic energy, through a reader antenna, towards the item to be tracked. An antenna on the RFID tag can pick up the energy, and an integrated circuit (IC) in the RFID tag can transmit information through the tag antenna back to the reader.

Ultra-High Frequency (UHF) RFID can use radio frequencies of 433 MHz, 865-868 MHz, and the 2.4 GHz range (e.g., 2.45-5.8 GHz and 3.1-10 GHz). In this frequency range, the RF can propagate efficiently with a reasonable amount of power consumption, and can be produced inexpensively.

However, the RF characteristics and performance of UHF RFID tags can vary depending on the dielectric properties of the substrate, e.g., the package that the UHF RFID tags are placed on. The dielectric of the substrate can change the resonate frequency of the antenna of the RFID tags, resulting in an impedance mismatch between the RFID antenna and the RFID chip, e.g., the antenna is detuned from the RFID circuit and degrading the performance of the RFID tags. In the case of severe impedance mismatch or detuned antenna in an RFID tag, the tag can stop working or the performance may fall below acceptable parameters due to the interference or any other type of effect by the object, product or other element such as field attenuation or frequency shifts caused by the object or other sources.

Thus there is a need for improved RFID transponders that remedy the substrate's ability to detune or interfere with the RFID system ability in a simple, cost effective and timely manner during or after manufacturing.

SUMMARY

Disclosed are improved methods, systems or apparatuses which may include integrating one or more RFID elements on or within a product or object to interact with an associated external device or devices such as an RFID reader. The innovative RFID elements and devices of the present invention may improve the performance or efficiency of the RFID transponder and reader system ability over existing prior art.

The present invention provides RFID devices, methods of forming the RFID devices, and systems of RFID devices for improved performance such as assuring a minimum of read or write distance, or other performance characteristic, even in the presence of degradation, interference, field attenuation, frequency shift or any other type of effect caused by the substrate or object the RFID system or elements are mounted in or on, as well as any other element, product or device, including background effects.

The present invention teaches to a structure method and apparatus wherein an Integrated RFID Antenna Fabrication Method and Apparatus for Transponder Assembly is described.

The present invention provides a structure, method and apparatus wherein the RFID device may have at least two RFID elements. A first RFID element can include an antenna element which can be integrated into or onto a physical object or product during or after the manufacture of the product. This may include that the first RFID element becomes a part of the object or product itself. A second RFID element can include a secondary antenna structure with an attached RFID IC and may be placed in or on the object.

The first and second RFID elements together can form a complete functioning RFID device and as such may be placed relative to each other to allow for interaction. For example, after the first element is formed in a package, the second element can be brought to the package, in the vicinity of the first element so that the first and second element can form a working RFID device. A system can be used to match the first and second elements such as the RFID transponder element, the first element, is "tuned" to the particular object or product so that transponder element will work for a desired application such as into the far-field. For example, an RFID reader can hold the second element, and can be designed to place and adhere the second element to the first element such that the combination and the relative position of the two elements form an optimum RFID transponder, e.g., an RFID transponder having a minimum read distance.

In some embodiments, the present invention discloses a RFID device having at least two elements that can be placed near each other to form a working RFID device, e.g., the two elements can be coupled by inductive coupling, magnetic coupling or capacitive coupling. By adjusting the relative position between the two elements, the working RFID device can be tuned to compensate for the effect of the substrate. For example, one element can be fabricated on a substrate, such as a package. The second element can be placed in a vicinity of the first element, with the relative position adjusted to have an improved RFID device, such as an optimum RFID device or an RFID device with a minimum read distance. The relative placement may be designed or determined by a device integral to the present invention system method or apparatus of which may be a smart placer or RFID placement device or other RFID placing device such as a RFID placement device, whether handheld or machine implemented.

The methods and systems disclosed herein may be implemented in any means for achieving various aspects. Other features will be apparent from the accompanying drawings and from the detailed description that follows.

BRIEF DESCRIPTION OF THE DRAWINGS

Example embodiments are illustrated by way of example and are not limited to the figures of the accompanying drawings, in which, like references indicate similar elements.

FIGS. 5A and 5B are a flow chart for forming an RFID transponder on a package according to some embodiments.

FIGS. 10A and 10B are flowcharts for placing integrated circuit elements on RFID ready packages according to some embodiments.

FIGS. 12A, 12B, 12C and 12D are component diagrams illustrating configurations for RFID ready products according to some embodiments.

FIGS. 14A and 14B are flow charts for designing RFID transponders according to some embodiments.

Figure 1:
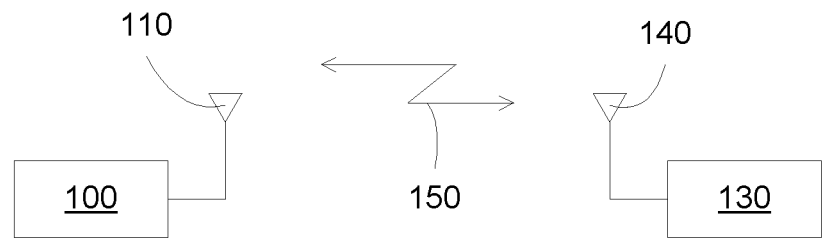
FIG. 1 is a component diagram of the basic components of an RFID system according to some embodiments.

Other features of the present embodiments will be apparent from the accompanying drawings and from the detailed description that follows.

DETAILED DESCRIPTION

Disclosed are improved methods, systems or apparatuses which may include integrating one or more RFID elements on or within a product or object to interact with an associated external device or devices such as an RFID reader Although the present embodiments have been described with reference to specific example embodiments, it will be evident that various modifications and changes may be made to these embodiments without departing from the broader spirit and scope of the various embodiments. It should be understood by one of ordinary skill in the art that the terms describing processes, products, elements, or methods are industry terms and may refer to similar alternatives In addition, the components shown in the figures, their connections, couples, and relationships, and their functions, are meant to be exemplary only, and are not meant to limit the embodiments described herein.

The applications for these RFID devices are numerous and include identification of goods to be sold in a retail environment, the identification of goods in a warehouse, the writing, storage, and reading of digital information pertaining to any particular physical object in a business or household environment. Virtually any and all physical objects can be tagged and digital information about that object can be written, stored, and read in an endless number of applications.

In some embodiments, the present invention discloses RFID devices, methods of forming the RFID devices, and systems for assuring improved performance of the RFID devices such as assuring a particular criteria of performance, such as a minimum of read distance, e.g., far-field read distance, of the RFID devices. An RFID device can have two RFID elements. A first RFID element can include an antenna element which can be integrated into or onto a physical object or product during the manufacture of that product such that the first RFID element becomes a part of the object or product itself. For example, an antenna element can be printed on a package such as a container. A second RFID element can include a secondary antenna structure with an attached RFID IC. The first and second RFID element can form a complete RFID device, e.g., a working RFID device.

In some embodiments, the first and second elements can be placed relative to each other. For example, after the first element is formed in or on a package, the second element can be brought to the package, in the vicinity of the first element so that the first and second element can form a working RFID device. A system can be used to match characteristics of the first and second elements, e.g. forming a working RFID transponder that will be "tuned" to the particular object or product such that the combined transponder element will work well or at a specific minimum criteria, for example, into the far-field. For example, an RFID reader can hold the second element, and can be designed to place and adhere the second element to the first element or to the object at a relative distance to the first element such that the combination and the relative position of the two elements form an optimum RFID transponder, e.g., an RFID transponder having a minimum read distance or other measurable characteristic.

In some embodiments, the present invention discloses a RFID device having at least two elements that can be placed near each other to form a working RFID device, e.g., the two elements can be coupled by inductive coupling, magnetic coupling or capacitive coupling. By adjusting the relative position between the two elements, the working RFID device can be tuned to compensate for the effect of the substrate or object mounted upon. For example, one element can be fabricated on a substrate, such as a package. The other element can be placed in a vicinity of the first element, with the relative position adjusted to have an improved RFID device, such as an optimum RFID device or an RFID device with a minimum read distance. The relative placement may be designed or determined by a device integral to the present invention system method or apparatus and the placement may be determined for each individual object and elements, such as every item in an assembly line, even of the same type or manufacture or may be individually assessed and the two RFID elements placed via the criteria of the assessment. In some other embodiments, every other item or some other order of the same type of item in the assembly line is assessed and adjustments made for quality control. In other embodiments, the relative distance is already known or is set on the assessment of the first object of the type in the assembly line. Additionally in other embodiments, the assembly line has a variety of different items, with different criteria and thus each item is assessed, or the type known for having a preset placing position and distance.

In some embodiments, the present invention discloses methods to improve the response characteristics of a RFID device after taking into account the effect of the substrate or object on which the RFID device is placed on or in. Since the substrate can affect the impedance matching of the components of the RFID device, the methods include tuning the RFID device after the RFID device is placed on the substrate. A first element of the RFID device can be prefabricated on the substrate, e.g., a package. The position of the second element can be adjusted to optimize the response of the RFID device, such as forming a working RFID device with a minimum read distance. For example, an RFID reader can have a power setting corresponded to a predetermined read distance for the RFID transponders. The position of the second element of the RFID device can be adjusted until the RFID reader communicates with the RFID transponder, e.g., the second element has formed a working RFID device with the first element that can be read by the RFID reader at a set power.

In some embodiments, the present invention discloses RFID readers, and methods to use the RFID readers, to improve the response of RFID transponders, especially after including the effect of the substrate that the RFID transponders are placed on. The RFID readers can include a label placer for placing an element of an RFID transponder on a package that already has another element of the RFID transponder. The RFID reader can have a visual display for indicating the response of the RFID transponder. For example, after setting the RFID reader to a predetermined power setting, which can be a minimum power setting corresponded to a minimum read distance for the RFID transponder, the element of the RFID transponder can move in a vicinity of the other element until the visual display indicates that there is communication with the RFID transponder. The label placer can then place the RFID element at that location.

It is noted that is some embodiments, more than two elements and more than three elements may be enlisted, including multiple of each type, such as more than one first RFID elements, for each second RFID elements, and in any combination.

FIG. 1 illustrates basic components of an RFID system according to some embodiments. An RFID transponder, element or tag 100 can communicate 150 with an RFID reader 130 through antenna 110 and 140. The RFID transponder 100 can include an integrated circuit or chip, for example, to store and process information, modulate and demodulate radio frequency (RF) signals 150 through the antenna 110. The RFID reader 130 can transmit a modulated RF signal 150 through the antenna 140 to the transponder 100. In a passive RFID system, the antenna 110 of the RFID transponder 100 receives the RF signal and form electric and magnetic fields to draw power for the integrated circuit. The integrated circuit in the RFID transponder 100 can modulate an RF signal 150 back to the RFID reader 130, providing information stored in the RFID transponder 100.

The electromagnetic field that surrounds an RFID antenna can be classified as a near-field and a far-field. Typically, near-field is defined as the field around the antenna up to one wavelength away. The far-field is the region beyond one wavelength. The near-field and far-field can have different energies so a typical RFID transponder can require a corresponding antenna type to get the best read range.

In some embodiments, the present invention provides for a magnetic coupling between the near-field RFID tag and the far-field antenna, so that both will function an s a far-field tag, the near-field RFID tag and the far-field antenna need to be maintained at a close distance, but not electrically coupled together. For example, they are coupled in proximity to each other, or a proximity relationship is defined there between. In one embodiment, the near-field only RFID tag and the far-field antenna should be maintained at a separation distance such as no more than $\frac{1}{4}$ of an inch or such as no more than $\frac{1}{8}$ inch or in other cases, such as $\frac{1}{16}$ inch. In many embodiments, the separation distance will be very small, such as smaller than $\frac{1}{16}$ of an inch or very large such as larger than $\frac{1}{8}$ of an inch. In some embodiments, an air gap is maintained between the near-field only RFID tag and the far-field antenna, whereas in other embodiments, an insulator or a non-electrically conducting material is located there between to prevent electrical coupling and/or aesthetic consideration. In other embodiments, the far-field antenna may be in physical or electrical connection with one of more of the near-field only tag, the interface circuit of the near-field tag or the loop. In such as cases, the far-field antenna and of the near-field tag will be electrically coupled and magnetically coupled. This can be an example of the far-field antenna and near-field only RFID tag being coupled in proximity to each other or with a proximity relationship defined there between.

Passive RFID device that operate in the far-field are generally manufactured and sold as standalone products with working transponders that are pre tuned for application to work on specific classes of products. This standalone product is comprised of a very large (relative to the integrated circuit) substrate in which, at a minimum, a far-field antenna is incorporated into or onto this large substrate. Presently in the most widely practiced technique, in addition to the far-field antenna, an inductive matching element (with a specific inductance designed to match the capacitive load of the integrated circuit) is also incorporated into or onto the large substrate and the integrated circuit is connected directly to the large substrate using highly specialized assembly machines which are expensive and time consuming.

There are numerous disadvantages to this most practiced technique. The material cost is high due to the relatively very large substrate. The assembly equipment cost is high due to the large distances between the assembled integrated circuits which requires customized machines that are very slow in terms of units per hour relative to more widely deployed integrated circuit assembly machines. This requirement for specialize and expensive production machinery then propagates out into the supply chain where, for example, the label converting machines and the printing and encoding machine are also slow, expensive, and specialized (custom) which causes even further problems as mentioned below.

The other disadvantage is that, as a practical matter, the transponders produced using currently known techniques can only be "tuned" to work on broad classes of products based on the dielectric constant of the products. Presently the ARC RFID lab that certifies products for use on certain categories of retail products has only nine separate categories. This means for most products the transponder attached is either somewhat less than optimum for that particular product or if the criteria or minimum operation necessitates custom tuning, which in current prior art takes time and expense as the encoding machines are tuned to the particular product and would have to be tuned every time or for every product or substrate, is thus less than optimal in manufacturing as a byproduct of the costs of optimization of the RFID system with prior art methods as previously mentioned.

Figure 2A:
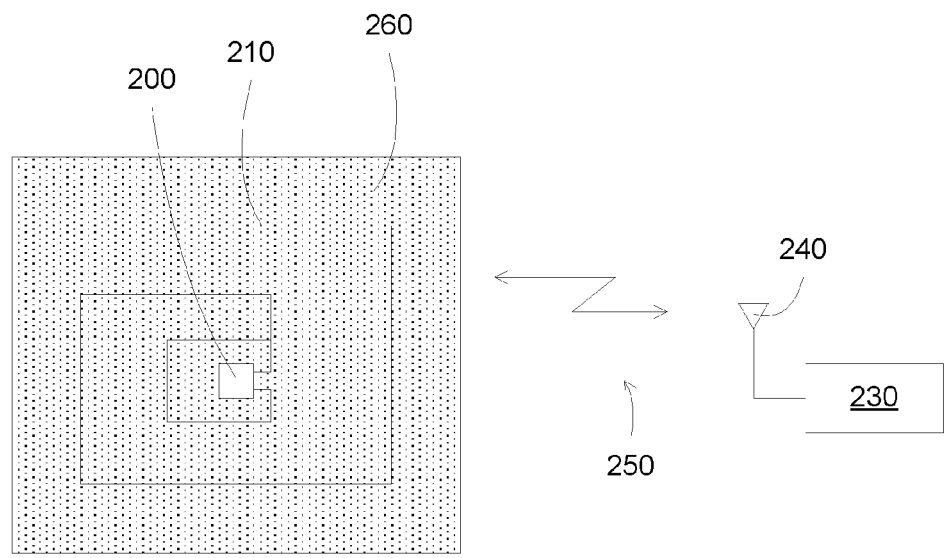
FIGS. 2A and 2B are component diagrams illustrating effects of substrate on the response of RFID transponders according to some embodiments.
Figure 2B:
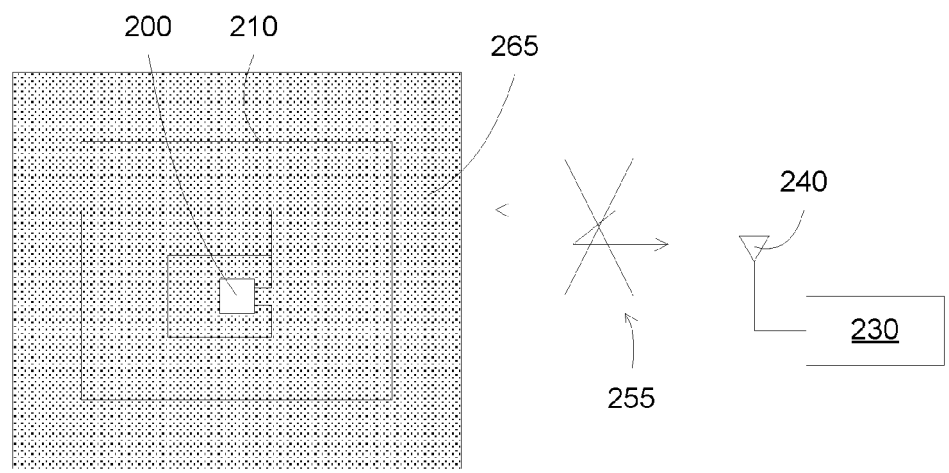

FIGS. 2A-2B illustrate effects of substrate on the response of RFID transponders according to some embodiments. In FIG. 2A, an RFID transponder can include an RFID chip 200 coupled to an antenna 210. The antenna 210 can include a loop (e.g., a near-field antenna element) and a far-field antenna element. The RFID transponder can be placed on a substrate 260, and can communicate 250 with an RFID reader 230 through antenna 240 of the RFID reader. The RFID transponder can function at near-field and far-field, meaning the RFID transponder can be read from both the near-field and the far-field.

In FIG. 2B, the same RFID transponder can be placed on a different substrate 265. The RFID transponder, due to the impedance mismatch caused by the dielectric of the substrate 265, can lose the communication 255, e.g., does not response to the RFID reader 240.

In some embodiments, the present invention discloses RFID transponders having an integrated circuit assembled to a loop (e.g., forming a near-field antenna) which can be inductively or capacitively coupled to a larger antenna creating a far-field transponder.

In some embodiments, an RFID transponder can include an RFID circuit inductively coupled to an antenna, e.g., the antenna is placed in close proximity of the RFID circuit. For example, the RFID transponder can include an RFID IC electrically connected to an impedance-matching structure, such as a loop structure, which can form a near-field antenna element. The RFID transponder can also include a resonant structure, such as a far-field antenna element, which has no electrical connection to the RFID IC. The resonant structure thus can be coupled to the impedance-matching structure and the RFID IC through an electric field.

Figure 3:
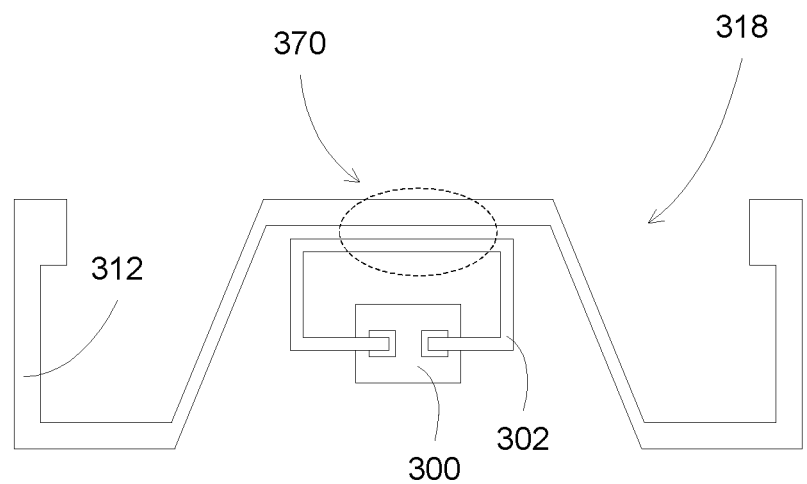
FIG. 3 is a diagram illustrating an RFID transponder having a loop structure coupled to a linear polarized antenna according to some embodiments.

FIG. 3 illustrates an RFID transponder having a loop structure coupled to a linear polarized antenna according to some embodiments. An RFID transponder 318 can include an RFID IC 310 electrically coupled to a loop structure 302. The loop structure 302 can function as a near-field antenna. A conductive linear polarized antenna 312, e.g., a dipole antenna structure, can be placed in close proximity to the loop structure 302. The antenna 312 can function as a far-field antenna. The loop structure 302 can connect inductively with the dipole antenna structure 312, e.g., there is a coupling element 370 that optimizes energy transfer between the antenna 312 and the loop structure 302. Further details of the loop RFID transponder can be found in U.S. Pat. No. 7,696,947, herein incorporated by reference in its entirety.

In some embodiments, the present invention discloses methods for forming RFID elements such as RFID transponders. The RFID transponders are tuned in the presence of packaging substrate, e.g., the impedance matching of the RFID transponders has been achieved including the effect of the packaging substrate. The RFID transponders can include two elements that are coupled inductively, magnetically or capacitively, thus do not require electrical contact. For example, the RFID transponders can include an RFID chip electrically connected to a loop structure, which can represent a near-field antenna for the RFID transponders. The RFID transponders can also include an antenna structure, which can function as a far-field antenna for the RFID transponders. The antenna structure can be configured to be a resonance structure for communication with the RFID chip through the loop structure.

In some other embodiments the manufacturing and design of the near-field RFID tag component is decoupled from or independent of the manufacturing and design of the far-field antenna. In some embodiments, the goal is not to design a fully integrated and packaged RFID tag including both a near-field RFID tag and the far-field antenna on the same substrate, as it is to be added later in the manufacturing, processing or product life. In several embodiments, a universal tag can be designed using only a simple pre-manufactured near-field only RFID tag and a separate and independently designed conductive element that will function as a far-field antenna. Since the design of the two component will be separate in some embodiments, the same near-field only RFID tag can be used for all items or products to be tagged. To account for the varying degree of de-tuning effect caused by certain items or products, only the conductive element need to be specifically designed. For example, in the case of a conductive element in the form of a simple wire, the length of the wire can be shortened to match the impedance of the far-field antenna to the integrated circuit.

In some embodiments, an element of the RFID transponder, such as the antenna structure, can be formed on or in a package, such as printing with conductive ink on a product such as a container or a box, attaching a foil on the product, cutting slots in a conductive substrate of the product, or coupling a holographic structure on the product. The product can be labeled "RFID ready" through the integration of an RFID antenna element directly into or onto the product during the manufacturing or processing of that product or object or later in the manufacturing/processing line or product life cycle. In some embodiments, the antenna structure can be specially designed for the package materials.

A second element of the RFID transponder, such as the RFID chip with the loop structure, can be fabricated separately. An advantage of the separation is the small foot print of the second element, since the RFID chip and the loop can be small as compared to the second element of the antenna. The second element can be placed and attached to the product having the integrated antenna, e.g., the second element can be placed in or on and attached to an RFID ready product or object.

In some embodiments, the placement of the second element can be adjusted according to real time RFID test information from an RFID reader that reads the performance of the assembly RFID transponder, e.g., the RFID transponder formed by assembling the first element of the antenna with the second element of the RFID chip connected to a loop structure. The adjustment of the second element while observing the assembled RFID transponder performance can allow for the formation of an optimum RFID transponder, for example, an RFID transponder that meets a performance requirement such as a predetermined power setting at the RFID reader, a minimum read distance after accounting for the substrate package.

Figure 4A:
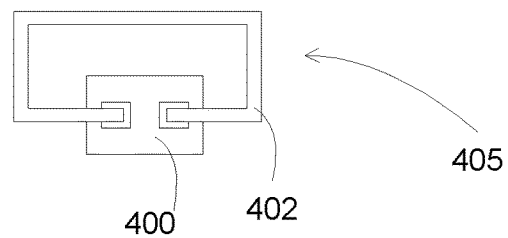
FIGS. 4A, 4B, and 4C are diagrams illustrating a process for forming an RFID transponder on a package according to some embodiments
Figure 4B:
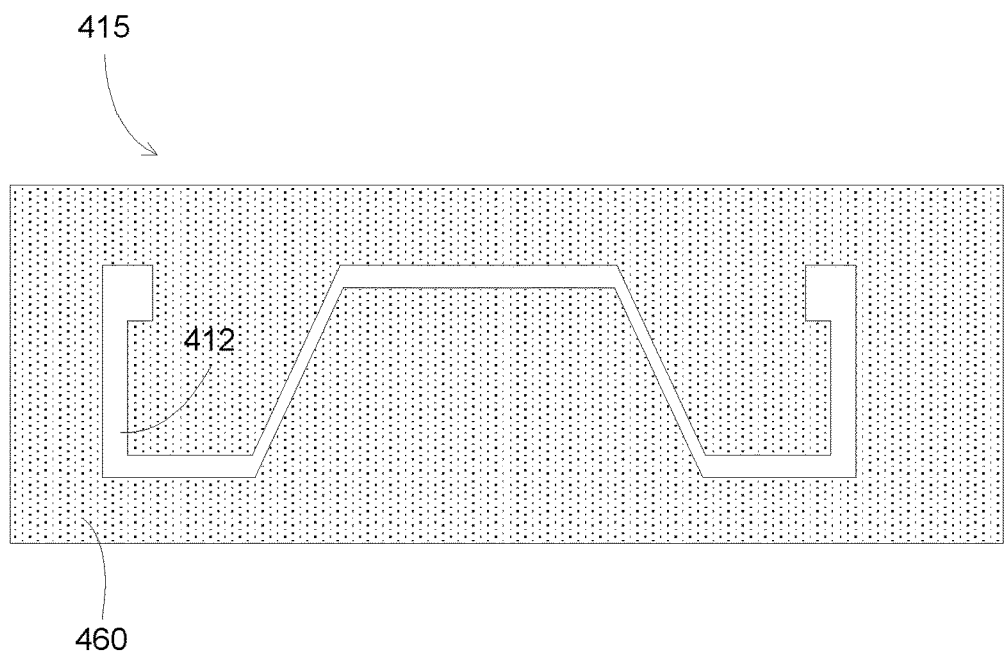
Figure 4C:
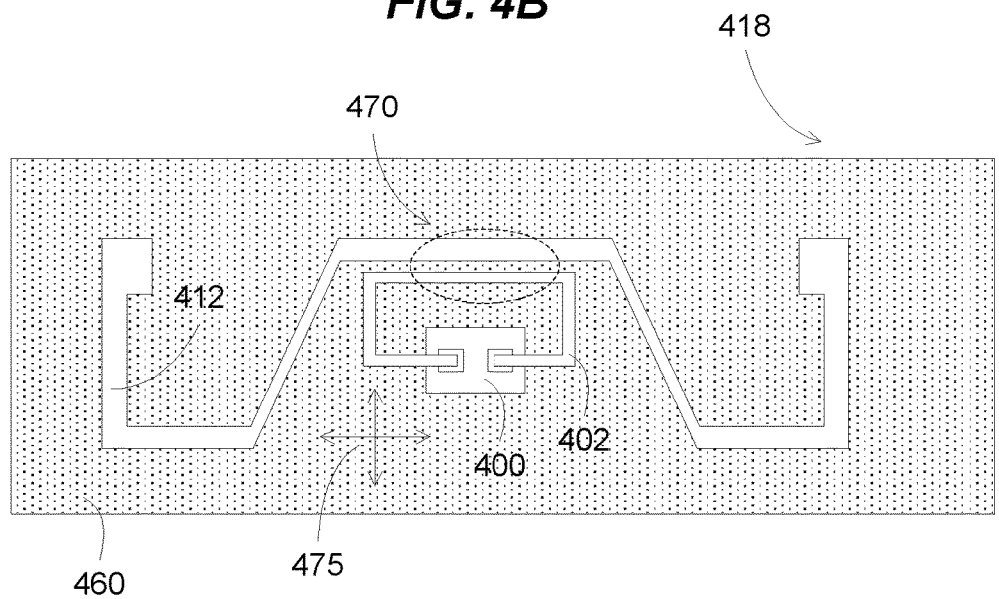

FIGS. 4A, 4B and 4C illustrate a process for forming an RFID transponder on a package according to some embodiments. In FIG. 4A, a first element 405 of an RFID transponder can be fabricated. The first element 405 can include an RFID chip 400 electrically connected to a loop structure 402. The loop structure can function as a near-field antenna for the RFID chip. The loop structure can also function as a matching element for an antenna structure which can be inductively or capacitively coupled with the RFID chip. The first element can be fabricated separately from the antenna structure or other elements. FIG. 4B shows an RFID ready package 415, which includes an antenna structure 412 formed on a package 460. The antenna structure 412 can be printed using a conductive ink on the package. The antenna structure 412 can be fabricated externally and then attached to the package. For example, an antenna in the form of a conductive wire can be constructed and then secured to the package surface. Alternatively, an antenna foil can be attached to the package. Conductive package material can have a slot cut to form an antenna structure.

In FIG. 4C, the first element 405 is brought to a vicinity of the second element 415. The first element 405 can move 475 to an optimum location, e.g., a location that can provide an optimum RFID transponder 418, such as an RFID transponder with good matching 470 between the loop structure 402 and the antenna structure 412. An RFID reader (not shown) can be used to determine the optimum location. For example, the optimum location can include locations that the complete RFID transponder (e.g., the RFID transponder formed by assembling the first and second elements) can respond to inquiry from the RFID reader at a lowest power setting. The RFID reader can have a first power setting, which can be chosen to be below the response threshold of the complete RFID transponder. This power setting can be verified by observing that the complete RFID transponder does not respond to inquiry from the RFID reader regardless of where the first element 405 is located, e.g., the first element can be moved around the second element but not working with the power level setting of the RFID reader. The power setting of the RFID reader can increase slightly, and the process repeated, until the complete RFID transponder responds. The locations of the first element at which the complete RFID transponder respond can be the optimum locations for the RFID transponder assembly 418, e.g., the working RFID transponder together with the package 460.

It is noted that the testing and measuring criteria for the RFID system may be completed or undertaken in any industry standard method, such as that aforementioned of which is used for example's sake, or via any other method, criteria or standards.

FIGS. 5A-5B illustrate flow charts for forming an RFID transponder on a package according to some embodiments. In FIG. 5A, operation 500 adjusts a position of a first component of an RFID transponder with respect to a second component of the RFID transponder to optimize a response characteristic of the RFID transponder. One of the first component and the second component is attached to a package. For example, the first component can be an RFID chip connected to a loop structure. The first component can function as a near-field antenna for the RFID transponder. The second component can be an antenna formed on a package. The second component can function as a far-field antenna for the RFID transponder.

In FIG. 5B, operation 520 forms a first element of an antenna on a package. The first element can be a far-field antenna. Operation 530 forms a second element of the antenna, wherein the second element of the antenna is coupled to an RFID chip. The second element can be a near-field antenna. Operation 540 positions the second element on the package in a vicinity of the first element. Operation 550 adjusts a position of the second element with respect to the first element to improve a response of the antenna.

Figure 6:
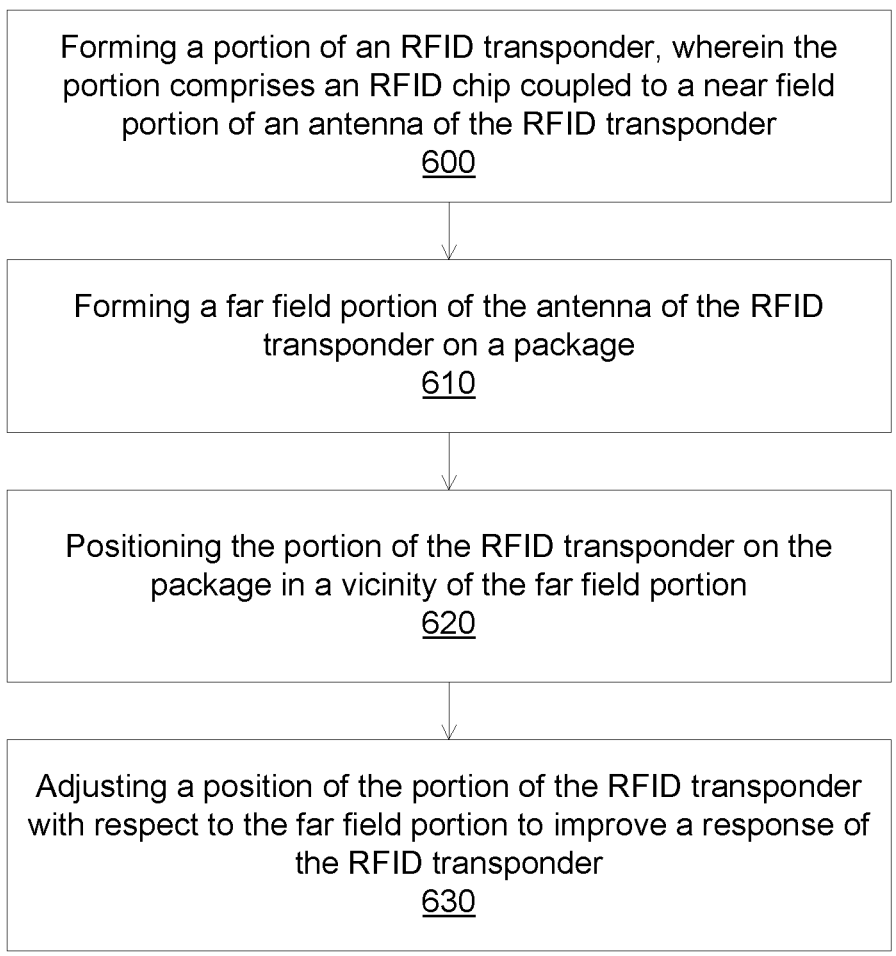
FIG. 6 is a flowchart for forming an RFID transponder on a package according to some embodiments.

FIG. 6 illustrates a flow chart for forming an RFID transponder on a package according to some embodiments. Operation 600 forms an element of an RFID transponder, wherein the element comprises an RFID chip coupled to a near-field element of an antenna of the RFID transponder. Operation 610 forms a far-field element of the antenna of the RFID transponder on a package. Operation 620 positions the element of the RFID transponder on the package in a vicinity of the far-field element. Operation 630 adjusts a position of the element of the RFID transponder with respect to the far-field element to improve a response of the RFID transponder.

In some embodiments, the first and second elements can be located on an outer surface or on an inner surface of the package, such as a container, a box, or a bottle. For example, the antenna structure can be fabricated on an outside or inside surface of a container. The antenna structure or the RFID chip element (with the loop structure or the near-field antenna) can be located on an underside of an adhesive sticker or label. Thus when the sticker or label is attached to the package, the antenna structure or the RFID chip element can be protected by the sticker or label.

Figure 7A:
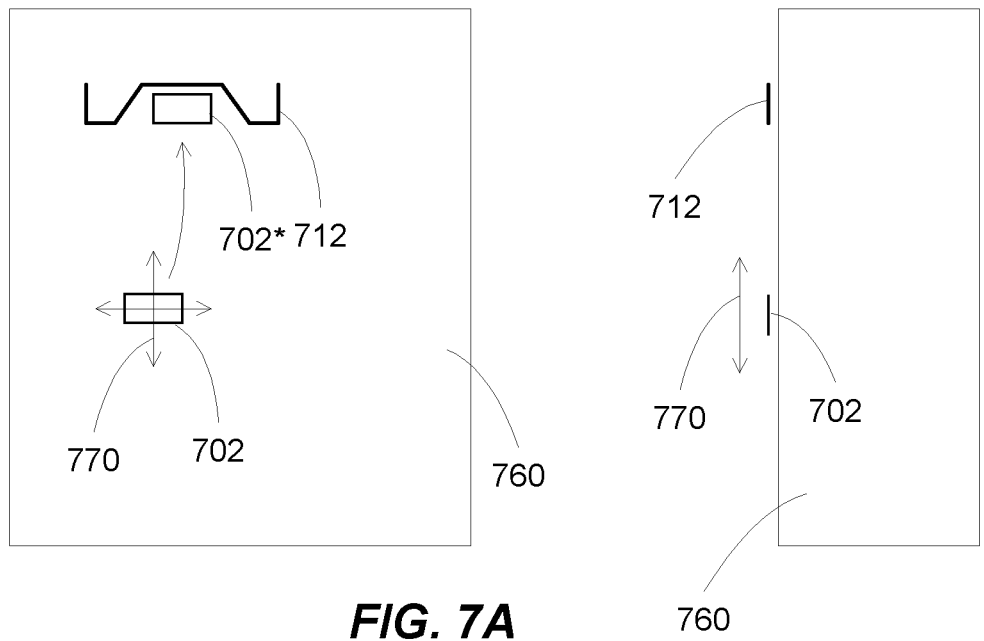
FIGS. 7A and 7B are component diagrams illustrating configurations for packages having RFID transponders according to some embodiments.
Figure 7B:
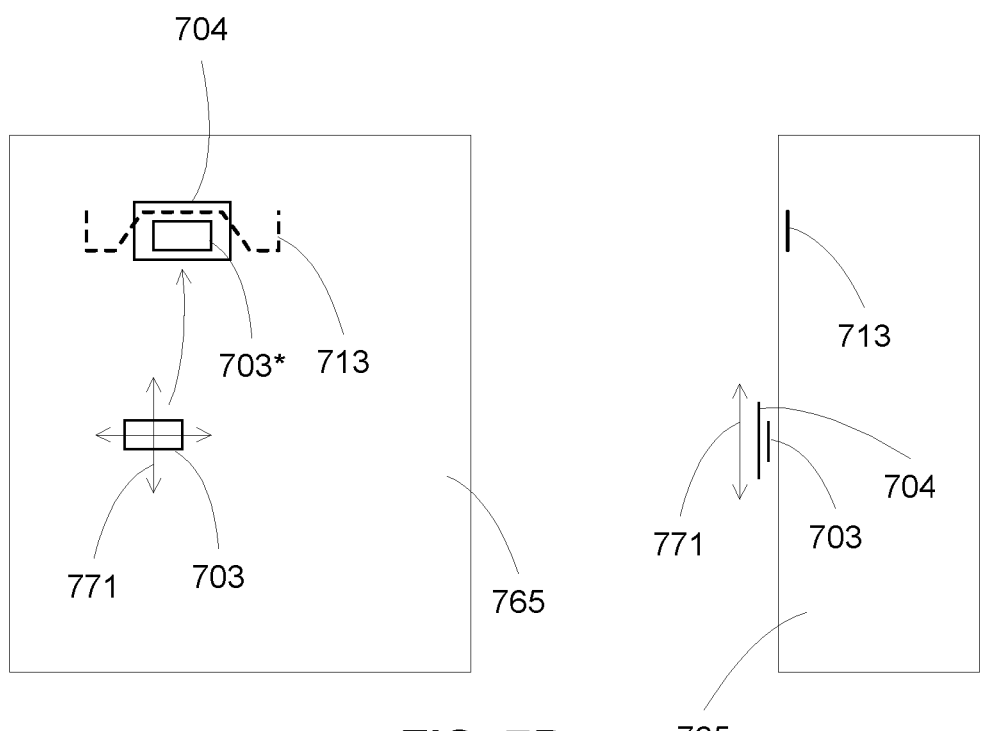

FIGS. 7A-7B illustrate configurations for packages having RFID transponders according to some embodiments. In FIG. 7A, an antenna structure 712 can be formed on an outer surface of a package 760, or in some embodiments, within a package 760. An RFID chip with a loop structure 702 can move 770 around the antenna structure 712 to reach an optimum position 702*. The RFID chip with a loop structure 702 can be placed on the outer surface, e.g., at a same surface as the antenna 712 or in some embodiments in the object or structure. In FIG. 7B, an antenna structure 713 can be formed on an inner surface of a package 765. An RFID chip with a loop structure 703 can move 771 around the antenna structure 713 to reach an optimum position 703*. The RFID chip with a loop structure 703 can be placed on an outer surface, e.g., at an opposite surface compared to the surface that the antenna 713 is placed on. A cover 704 can be used to cover the RFID chip with a loop structure 703. Alternatively, the RFID chip with a loop structure 703 can be formed on an adhesive side of the cover 704. Thus the RFID chip with a loop structure 703 can be attached to the package using the adhesive surface of the cover 704. Other configurations can be used, such as a cover for the antenna 712, a cover for the RFID chip with a loop structure 702.

It is noted that in some embodiments any of the elements, such as the RFID elements, antennas, or any associate pieces are interchangeably able to be placed within the object or item, on the surface on an object or item, on different surfaces or in different sections of the object or item, or any combination of the aforementioned to aid in tuning, structural integrity, due to space constraints for any reason or criteria. The tuning placement of the two RFID elements may help to alleviate the problems presented with the ability to be on or within the object or product.

In some embodiments, the present invention discloses systems and methods to form RFID transponders on or in a package with the properties of the package included in the behaviors and characteristics of the RFID transponders. The methods can include a fabrication of integrated RFID ready antenna into or onto products or other objects. The large antenna can be integrated directly into various products, packages, and labels using existing process already standing in the manufacturing facilities of these various products. For example, products or objects that use printing can add a conductive ink to the printing process to form the integrated antenna. Products or objects that use metal embossing can add an antenna shape for functioning as an antenna for the RFID transponder. Products or objects that are clad in metal can add an antenna slot in the metal to form an antenna structure.

It is noted that in some embodiments, the elements are positioned, placed or adhered via any method including being manufacturing within the object substrate, adhered through the use of an adhesive or glue, printed on such as with conductive ink, embossed, friction fit, snapped or buttoned on, connected via a generic or proprietary connecter, captivated or through any other known method one in the art would contend.

It is noted that in some embodiments, the fabrication or manufacturing of each of the steps, such as the product itself, the RFID elements, such as the IC, antenna or any of the devices, may be manufactured or processing via any method and can integrate all the elements in one manufacturing step, or a limited amount of manufacturing steps, such as through 3D printing, wherein the cavity for the RFID elements, or the RFID elements themselves are printed via the 3D printer with conductive media. In other embodiments, traditional methods using single step, or more than one step manufacturing can also be enlisted.

The methods can include placement and attachment of an integrated circuit element to the RFID ready products or objects, for example, by using a smart placer or RFID placement device. The integrated circuit element can be placed on the RFID ready products using low cost machines, such as smart placer or RFID placement device systems that first locate the RFID ready antenna utilizing the feedback from a RFID reader. The RFID reader power setting can be set to a high RF power and then undergo a single or over a series of power reductions while getting feedback from the integrated circuit element. The integrated circuit element can be placed on the RFID ready products at a location determined by the RFID reader as having feedback response at a lowest power setting.

For example, the RFID reader can be set at a high power setting. The integrated circuit can move around the antenna on the RFID ready product. Thus an area can be determined in which the integrated circuit can respond to inquiry from the RFID reader. A lower setting for the RFID reader can be used, and the process is repeated, to identify a small area in which the integrated circuit can respond to inquiry from the RFID reader at the lower power setting. The process can be continued until the RFID reader experiences a lowest power setting, e.g., the minimum power setting that the integrated circuit can respond. Alternatively or additionally, the process can be continued until the area that the integrated circuit can be placed on becomes small, e.g., there is only one position that the integrated circuit can be placed on. Other configurations can be used. For example, the RFID reader can start at a lowest power setting. At that lowest power setting, the integrated circuit does not respond to inquiry from the RFID reader. The power can increase until there is a position on the package that the integrated circuit can respond. The integrated circuit then can be placed at the location.

The smart placer or RFID placement device can also have the capability to print other information (such as a bar code, serial number, date code, etc., etc.) and to encode said information or a pointer to said information and/or other information as specified.

The smart placer or RFID placement device can include a label placer, an RFID reader and monostatic or bistatic antenna as well as any other devices or elements or tools necessary to measure a criteria of the RFID device to aid in efficient and proper calibration, measurement, design or installation. The integrated circuit can be optimally placed by using a minimum transmit power such that there is no transponder response until the label is moved into the proper position relative to the (integrated) RFID ready antenna. For example, a handheld RFID reader can have 4 cm of foam over the antenna with chip-loop attached to the foam face furthermost from the antenna. The transmitted power is lowered such that the label does not "turn on". A detached dipole antenna can be on the reverse side of a package, such as a piece of cardboard. An operator of the handheld reader cannot see the antenna although the operator would know approximately where it is located. The operator can take the handheld reader with the foam and the loop and brings it with the loop sliding along the cardboard in the general area of where the loop will eventually be optimally placed. When the loop has reached the optimum placement location relative to the dipole it will inductively couple into the dipole and the transmitted power will turn on the tag which will respond with an EPC and reader display will light up with the tag EPC and the operator will know that the loop can be optimally placed on the back of the cardboard.

It is noted that the handheld reader, the smart placer or RFID placement device, may also be a similar device, such as instead of handheld, may be a standalone device on an assembly line, or integrated in other handheld, or static devices, such as being integrated into another machine on an assembly line.

In an embodiment, the present invention and smart placer or RFID placement device may be associated into an industrial or commercial machine, system or apparatus, such as on an assembly line such as a printing machine. In an embodiment the apparatus such as the printing machine may have RFID placing capabilities, such as machine being able to print the RFID IC with near-field antenna with conductive inks, or placing or attaching the RFID IC with near-field antenna onto the product after, during or before manufacturing completion. The machine may provide for all or some of the smart placer or RFID placement device functions such as determining the location of the RFID-far-field antenna integrated in the object previously, and determining the proper position and location of the RFID IC with near-field antenna based on any type of effect such as interference, frequency shift, or field attenuation caused by the object or otherwise. This may be in addition to the machine normal manufacturing ability such as a printer, of which in addition to being able to print color ink, may also print using conductive inks or other process or simply print or place the RFID element such as the RFID IC with near-field antenna. In another embodiment, the machine may also, or instead, place the RFID far-field antenna on or in an object as to integrate the far-field antenna in the object, in addition to the machine's other processes. In another embodiment, the machine may do both the printing or placing or integration of the RFID far-field antenna and printing as well then additionally, act as a smart placer or RFID placement device, placing or integrating the RFID IC with near-field antenna. Thus, an embodiment may describe a machine, which in addition to the other processing or manufacturing, places both the RFID IC with near-field antenna and also the RFID far-field antenna, and then in another embodiment, a manufacturing or processing machine may only place the RFID IC with near-field antenna (acting as a smart placer or RFID placement device) or only integrate the RFID far-field antenna, but not bot. These steps though, may be in addition of other steps performed by the machine.

In some embodiments, the present invention discloses a process for forming products with RFID transponders attached and the RFID transponders have been tuned, placed or positioned to take into account a dielectric property or other properties of the substrate, object or product that cause any type of effect or interference of the interacting fields and communication between the RFID IC with near-field antenna and RFID far-field antenna such as passive interference, active interference, or field attenuation, such as caused by distance of the RFID elements and explained by the Friis transmission equation, or frequency shifts, such as caused by a dielectric property of the product of which is a permittivity parameter of the product. For example, integrated circuit elements can be designed so that the integrated circuit elements can be coupled into an RFID ready antenna. The integrated circuit elements can be manufactured. The RFID ready antenna elements can be designed so that the antenna elements can be integrated into or onto a product, package, label, or other object. The RFID ready antenna design can be distributed or manufactured. For example, the RFID ready antenna can be integrated into or onto target products or objects using the products or objects as the substrate for the antenna, for example, during the manufacture of the products or objects.

The integrated circuit element can be placed between the smart placer or RFID placement device reader antenna and the product having the RFID ready antenna. In some embodiments, a marker can be placed on the RFID ready product to indicate the general location of the antenna, especially if the antenna is unseen, for example, forming in an inner of the product or embedded within a wall of the product. The smart placer or RFID placement device can indicate an optimum position to place the integrated circuit. For example, the reader in the smart placer or RFID placement device can transmit a low level of power set so that the integrated circuit will respond only when its antenna couples optimally into the RFID ready antenna. The reader, the integrated circuit, or the product can be moved until the integrated circuit element couples into the RFID ready antenna. The integrated circuit element can be placed using feedback from the reader to identify an optimum location for placing and attaching the integrated circuit element.

Figure 8A:
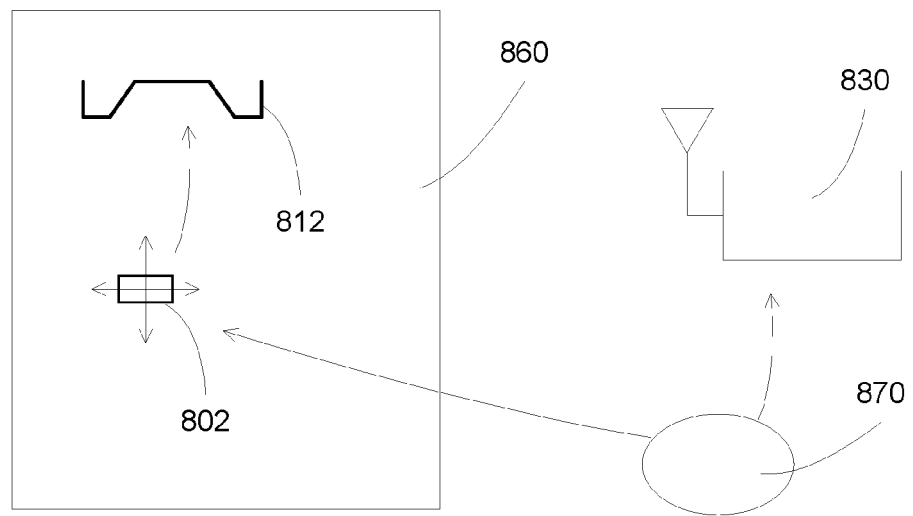
FIGS. 8A and 8B are component diagrams illustrating configurations for packages having RFID transponders according to some embodiments
Figure 8B:
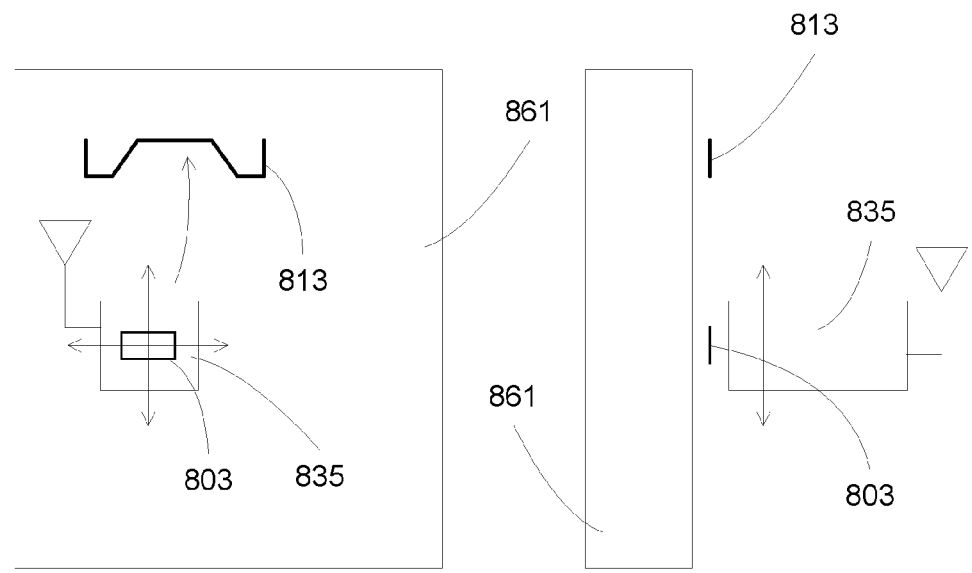

FIGS. 8A-8B illustrate processes for placing integrated circuit elements on RFID ready packages according to some embodiments. In FIG. 8A, an RFID ready package can be provided, including an antenna structure 812 formed on a surface of a package 860. The antenna structure can be formed integrated with the package, e.g., formed during or after the formation of the package. The antenna structure can be attached to an already-formed package, e.g., the antenna and the package are fabricated separately, and then attached to each other. An operator 870 can bring an integrated circuit element 802 (e.g., including an RFID chip connected to a loop structure) to a close vicinity of the antenna structure. The integrated circuit element 802 can be designed to match with the antenna structure 812 to form a working RFID transponder. The operator can also hold an RFID reader 830. By using feedback from the RFID reader, the operator can determine an optimum location for the integrated circuit element, e.g., a location at which a minimum power setting of the RFID reader can detect the RFID transponder, or a location that can provide a minimum read distance for the RFID transponder. In other embodiments, other criteria may be measured and determine the proper placement of the elements.

In FIG. 8B, an RFID ready package can be provided, including an antenna structure 813 formed on a surface of a package 861. The antenna structure can be formed integrated with the package or can be attached to an already-formed package. An integrated circuit element 803 can be supported by an RFID reader 835. The RFID reader can move together with the integrated circuit element. By using feedback from the RFID reader, the optimum location for the integrated circuit element can be determined. The integrated circuit element can be placed at the optimum location, for example, using a label placer.

Figure 9A:
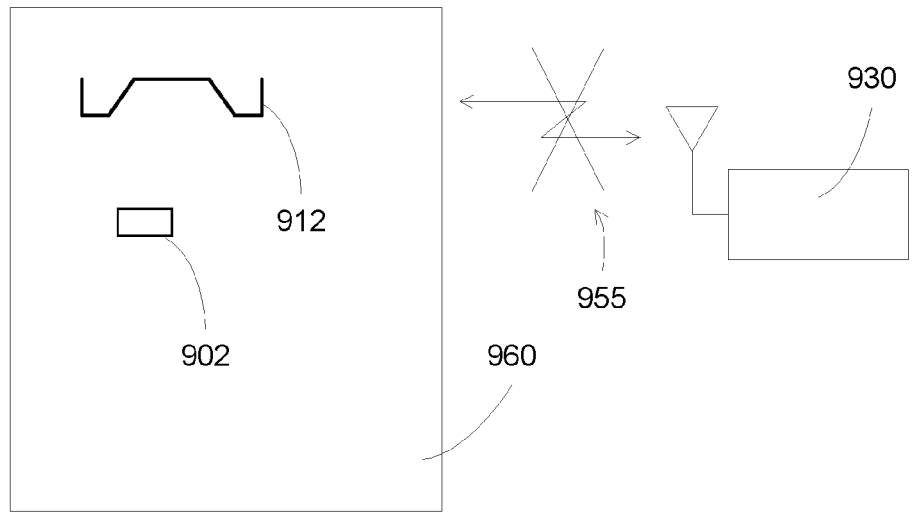
FIGS. 9A and 9B are component diagrams illustrating processes for placing integrated circuit elements on RFID ready packages according to some embodiments.
Figure 9B:
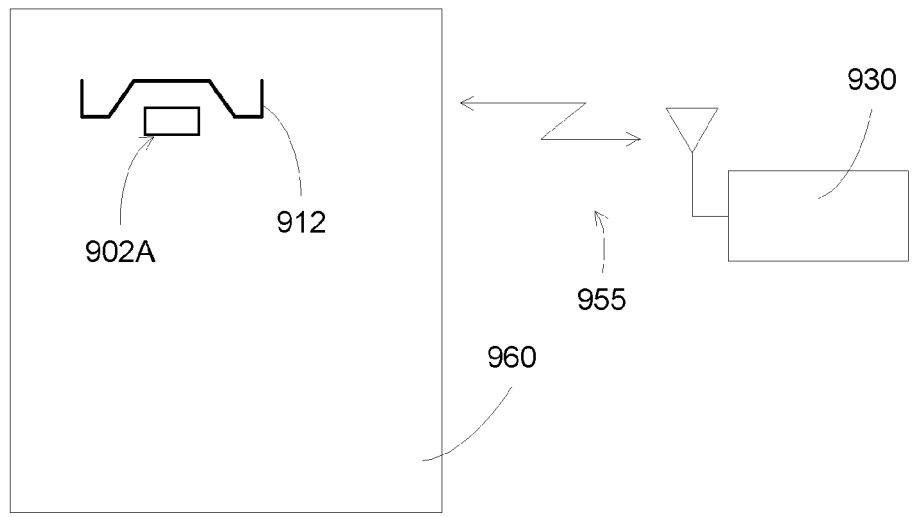

FIGS. 9A-9B illustrate processes for placing integrated circuit elements on RFID ready packages according to some embodiments. In FIG. 9A, an RFID ready package can be provided, including an antenna structure 912 formed on a surface of a package 960. An integrated circuit element 902 can be brought to a vicinity of the antenna structure 912. The integrated circuit element 902 can be designed to match with the antenna structure 912 to form a working RFID transponder. An RFID reader 930 can have a low power setting so that there is no response from the RFID transponder regardless of the position of the integrated circuit element. The RFID reader can have the power setting increased by a small amount. The power can be further increased and/or decreased until there is a response from the RFID transponder. In FIG. 9B, the RFID reader can receive response from the RFID transponder at a location 902A of the integrated circuit element. By using feedback from the RFID reader, the optimum location for the integrated circuit element can be determined. The integrated circuit element can be placed at the optimum location, for example, using a label placer.

FIGS. 10A-10B illustrate flow charts for placing integrated circuit elements on RFID ready packages according to some embodiments. In FIG. 10A, operation 1000 attaches a first element of an RFID transponder to a package, wherein the package comprises a second element of the RFID transponder, wherein the first and second elements form a complete RFID transponder, therein the complete RFID transponder is configured to have a response with an RFID reader at an optimum power setting.

In FIG. 10B, operation 1020 selects a power setting for an RFID reader. Operation 1030 moves a first element of an RFID transponder with respect to a second element of the RFID transponder, wherein the second element is attached to a package. Operation 1040 identifies an area in which the RFID reader has communication with the RFID transponder. Operation 1050 lowers the power setting and repeating identifying. Operation 1060 attaches the first element to the package in an area having lowest power setting.

In some embodiments for the processes aforementioned in FIG. 10 and in any other embodiments and figures, the order of the processes may be presented or produced in any order as the manufacturing or processing dictates.

Figure 11A:
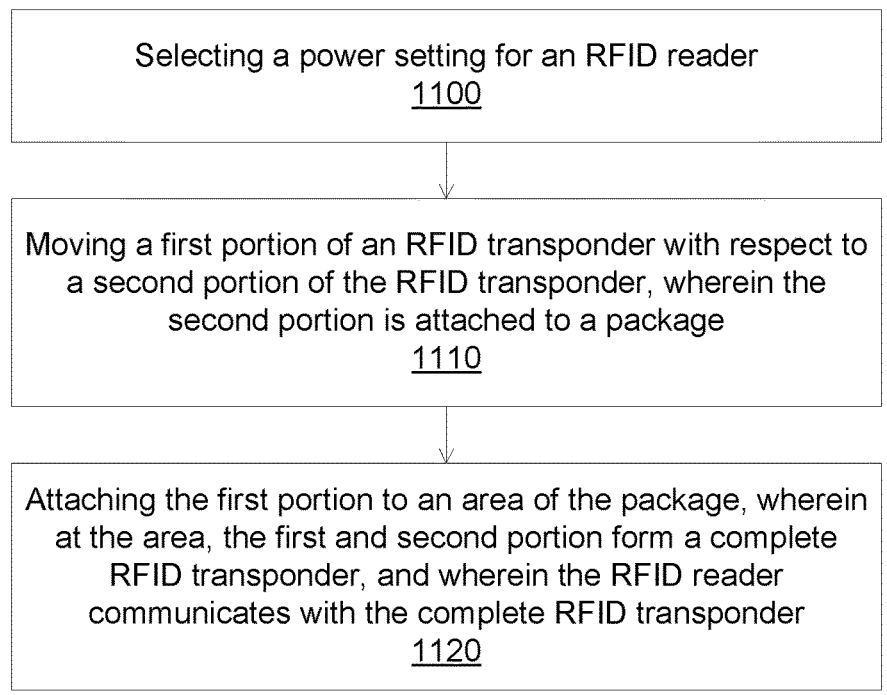
FIGS. 11A and 11B are flowcharts for placing integrated circuit elements on RFID ready packages according to some embodiments.
Figure 11B:
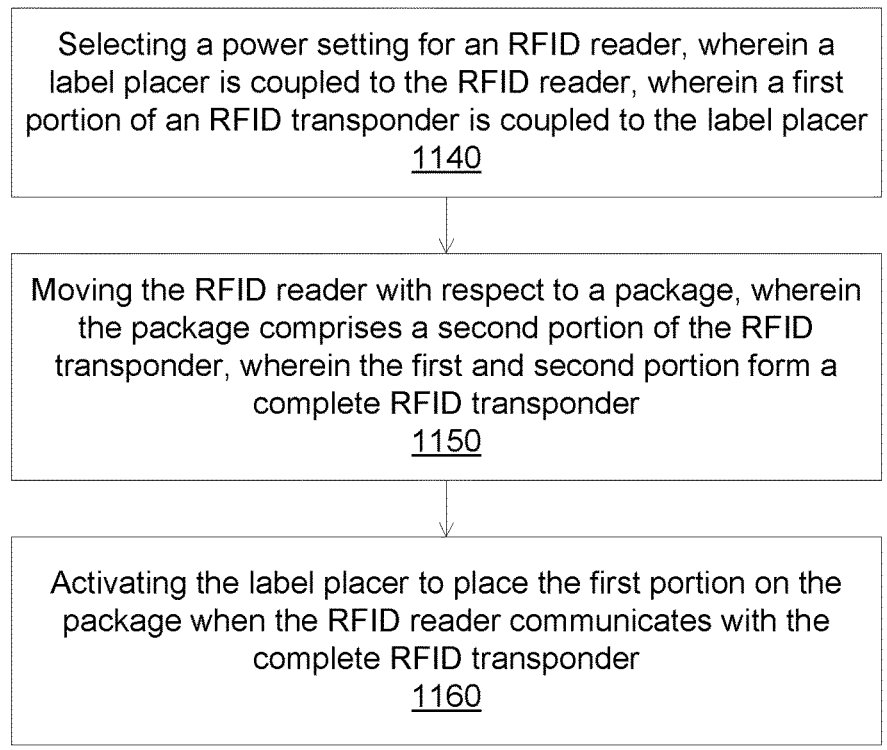

FIGS. 11A-11B illustrate flow charts for placing integrated circuit elements on RFID ready packages according to some embodiments. In FIG. 11A, operation 1100 selects a power setting for an RFID reader. Operation 1110 moves a first element of an RFID transponder with respect to a second element of the RFID transponder, wherein the second element is attached to a package. Operation 1120 attaches the first element to an area of the package, wherein at the area, the first and second element form a complete RFID transponder, and wherein the RFID reader communicates with the complete RFID transponder.

In FIG. 11B, operation 1140 selects a power setting for an RFID reader, wherein a label placer is coupled to the RFID reader, wherein a first element of an RFID transponder is coupled to the label placer. Operation 1150 moves the RFID reader with respect to a package, wherein the package comprises a second element of the RFID transponder, wherein the first and second element form a complete RFID transponder. Operation 1160 activates the label placer to place the first element on the package when the RFID reader communicates with the complete RFID transponder.

In some embodiments, the present invention discloses RFID ready packages and methods to fabricate RFID ready packages. A package, such as a container, a box, a bottle, a product, an object, a label, a product label, a product packaging, a carton, or a pallet can have an integrated antenna fabricated thereon. For example, an antenna can be printed using a conduction ink during the offset printing of a cardboard box used as a package for a perfume or other liquid or non-liquid product. An antenna can be made by die-cutting a slot into the metal foil during the lamination process of a cardboard box used for perfume or other liquid or non-liquid product. An antenna can be made by stamping foil into PVC box used for perfume or other cosmetic product or other products. An antenna can be made for the holographic foil used as an anti-counterfeit feature.

FIGS. 12A, 12B, 12C and 12D illustrate configurations for RFID ready products according to some embodiments. In FIG. 12A, an antenna 1212 can be printed or attached on a substrate 1260 of a package. In FIG. 12B, a slot 1213 can be cut from a conductive substrate (such as a metal panel) of a package. In FIG. 12C, integrated circuit including RFID chip 1200 together with loop structure 1202 can be brought close to the antenna 1212 to form an RFID transponder. In FIG. 12D, integrated circuit including RFID chip 1201 together with loop structure 1203 can be brought close to the antenna 1213 to form an RFID transponder.

In some embodiments, the present invention discloses antenna structures for packages having similar, e.g., not significantly different, properties related to RF transmission, such as the dielectric properties. An antenna structure can be used on multiple product packages that have materials covering a range of dielectric constants. The effect of the varying dielectric constants can be compensated by the placement of the integrated circuit relative to the antenna structure. It is noted that any type of measurement may be made over in a production line, or multiple for quality control. Also if the piece or object is pre-manufactured a known constant may be used for the shape, material or product itself. This can save time and expense for the RFID installer or manufacturer.

In some embodiments, the design of the integrated circuit (e.g., the RFID chip and the loop structure) and the antenna (e.g., the far-field antenna) of the RFID transponders has included the effect of the package. Further, the design of the RFID transponders can allow for the relative positioning of the integrated circuit and the antenna, e.g., permitting a tuning of the impedance matching by moving the integrated circuit relative to the antenna. For example, the loop structure, which can represent the matching between the RFID chip and the antenna, can be designed with consideration of the package materials. The design of the antenna can be simplified since the final tuning can be performed with the relative location between the integrated circuit and the antenna.

In some embodiments, an antenna structure can be used for a range of dielectric constants in the package materials. Thus the number of antenna structures for packages can be greatly reduced. The design of the integrated circuit and the antenna can include the dielectric properties of the package that the RFID transponder will eventually be attached to. However, with the additional tuning process of moving the integrated circuit with respect to the antenna, one design of the RFID transponders can be used in multiple packages that have dielectric constant within a range of values.

It is noted that in other embodiments, any effect or any type or combination of effects such as interference such as passive interference, active interference, field attenuation, such as caused by the distance of the RFID elements and explained by the Friis transmission equation, or frequency shifts, such as caused by a dielectric property of the product of which changes a permittivity parameter of the substrate, product, object or otherwise, may be compensated for and used as a range for placement and method.

Figure 13A:
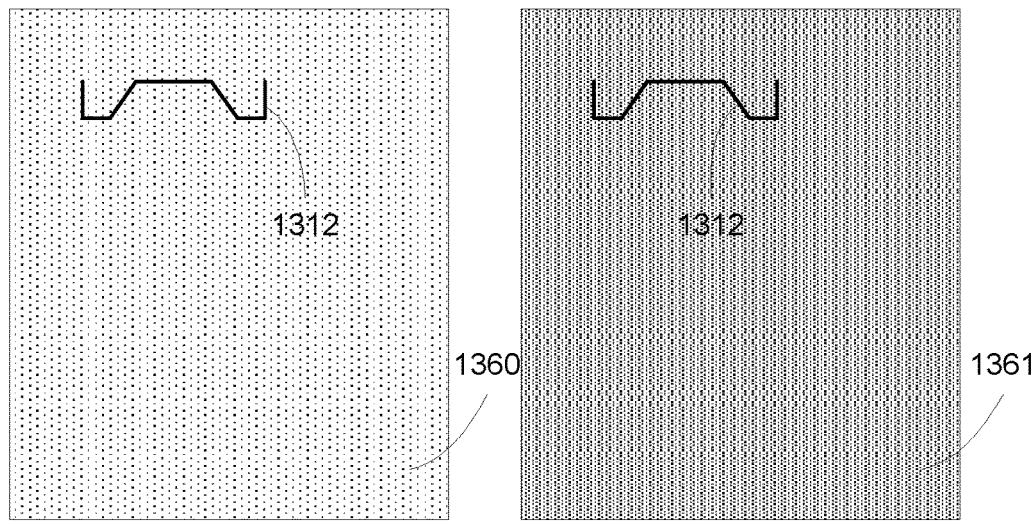
FIGS. 13A and 13B are component diagrams illustrating configurations for antenna in different package materials according to some embodiments.
Figure 13B:
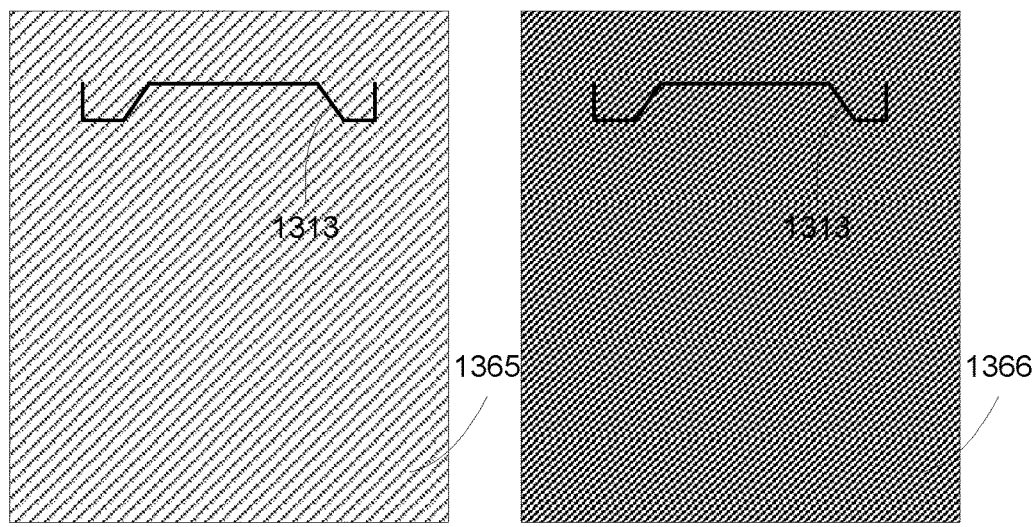

FIGS. 13A-13B illustrate configurations for antenna in different package materials according to some embodiments. In FIG. 13A, an antenna 1312 can be used for packages 1360-1361 that have different dielectric constants. The range of dielectric constant values for packages 1360-1361 can be determined by the tuning range of the RFID transponders, e.g., moving the integrated circuit element of the RFID transponders relative to the antenna 1312.

In FIG. 13B, another antenna 1313 can be used for packages 1365-1366 that have different dielectric constants and the dielectric constants can be in a different range as compared to that of the packages 1360-1361. The range of dielectric constant values for packages 1365-1366 can be determined by the tuning range of the RFID transponders, e.g., moving the integrated circuit element of the RFID transponders relative to the antenna 1313. The range of dielectric constants for packages 1365-1366 (e.g., for antenna 1313) can overlap the range of dielectric constants for packages 1360-1361 (e.g., for antenna 1312).

Thus a few number of antenna structures can be used to cover different packages having a wide range of dielectric constants or other effects such as interference criteria or properties.

FIGS. 14A-14B illustrate flow charts for designing RFID transponders according to some embodiments. In FIG. 14A, operation 1400 forms a first element of an RFID transponder to multiple packages, wherein the multiple packages have different effects on the RFID transponder. Operation 1410 reduces the different effects by adjusting positions of a second element of the RFID transponder on the multiple packages.

In FIG. 14B, operation 1430 classifies packaging materials into multiple groups. Operation 1440 forms different antenna elements on each group. Operation 1450 tunes remaining elements of the RFID transponders to each package in a same group.

In some embodiments, the present invention discloses smart placer or RFID placement device systems for placing and attaching an element of an RFID transponder to achieve a desired performance characteristic for the RFID transponder. The smart placer or RFID placement device can function to adjust the placement of the integrated circuit element of the RFID transponder, e.g., the RFID chip coupled with the loop structure for impedance matching with an antenna that is to be inductively or capacitively coupled with the loop structure. The smart placer or RFID placement device can place the integrated circuit element according to real time RFID test information from an RFID reader integrated into the smart placer or RFID placement device.

Figure 15A:
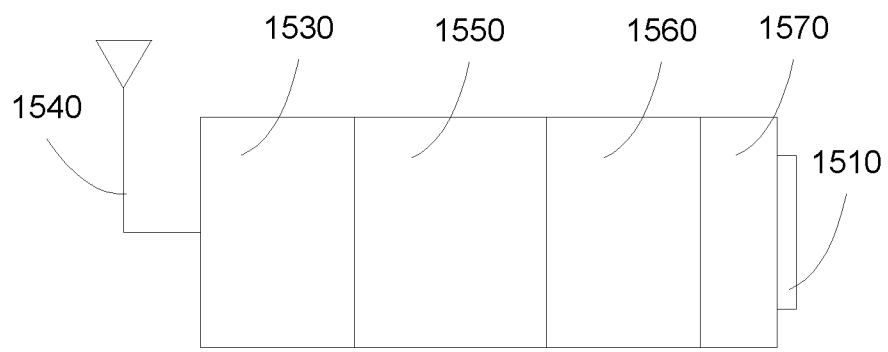
FIGS. 15A and 15B are component diagrams illustrating smart placer or RFID placement device systems according to some embodiments.
Figure 15B:
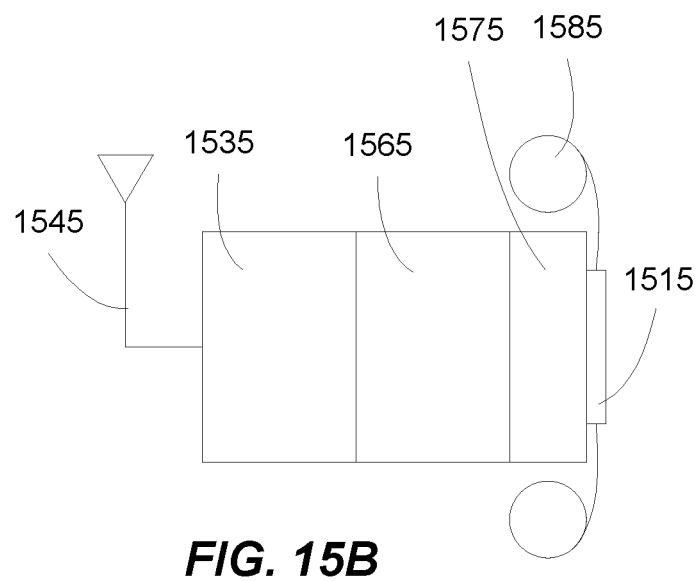

FIGS. 15A-15B illustrate smart placer or RFID placement device systems according to some embodiments. In FIG. 15A, a smart placer or RFID placement device can be a handheld device, which can include a label holder 1570, a label placer 1560, an RFID reader 1530, a transmitting and receiving antenna 1540, and a visual display 1550. The label 1510 is placed manually by an operator upon observing via the display that the label is optimally placed as indicated by the IC responding upon being turned on by the transmitted power. The label can include an adhesive sticker having an RFID chip coupled to a loop structure.

In FIG. 15B, a smart placer or RFID placement device can be an automatic device, which can include an article feeder 1585, a label holder 1575, a label placer 1565, an RFID reader 1535, a transmitting and receiving antenna 1545, a controller with embedded logic for activating and determining the placer when the label 1515 is optimally placed as indicated by the IC responding upon being turned on by the transmitted power. The automatic device can automatically feed labels, e.g., an adhesive sticker having an RFID chip coupled to a loop structure.

Figure 16:
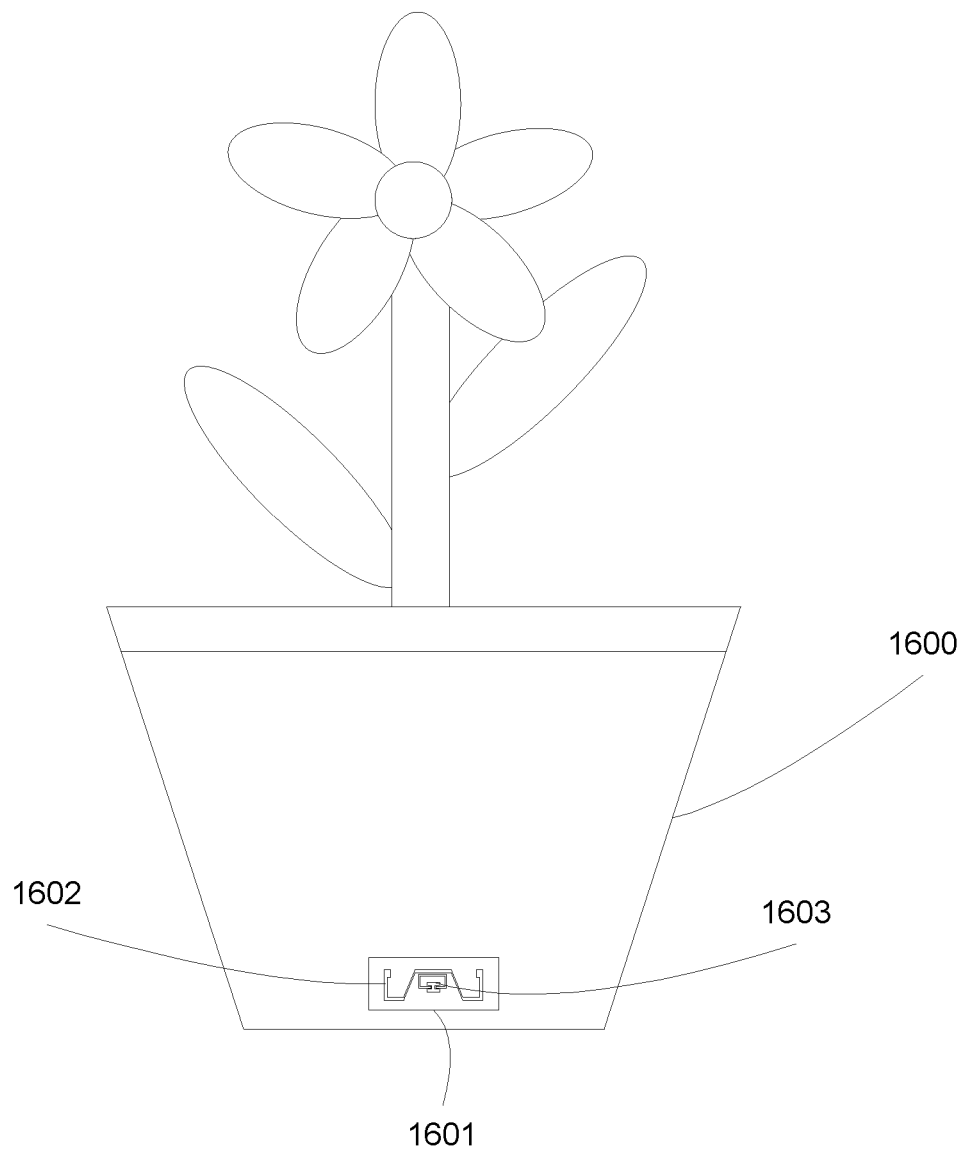
FIG. 16 is a representation of a preferred embodiment illustrating the RFID system on an object.

FIG. 16 illustrates a preferred embodiment of an RFID system on an example object. In FIG. 16 a preferred embodiment of the system, apparatus or method of the present invention is presented with, RFID elements and system 1601 embedded on a product such as a planter pot 1600, wherein the RFID system 1601 was inserted during the production and fabrication of the planter pot. The first antenna 1602, of which may be the far-field antenna integrated into the object 1600, may be made part of the object at an ideal location on the planter. The second antenna 1603 of which may be a near-field antenna with RFID IC may be placed at a location wherein the 1602 element and 1603 element may interact.

Figure 17A:
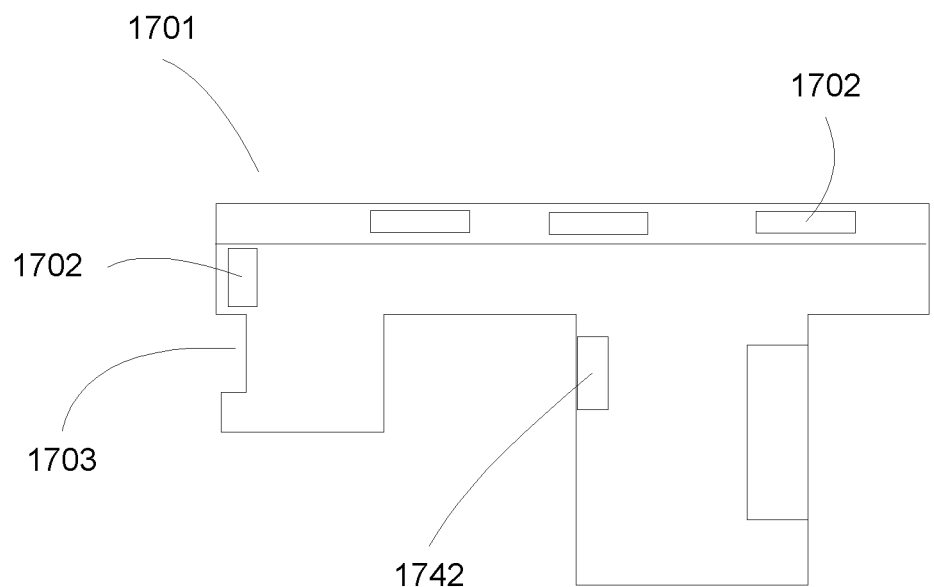
FIGS. 17A and 17B is a representation of a preferred embodiment illustrating a handheld smart placer or RFID placement device for the RFID system.
Figure 17B:
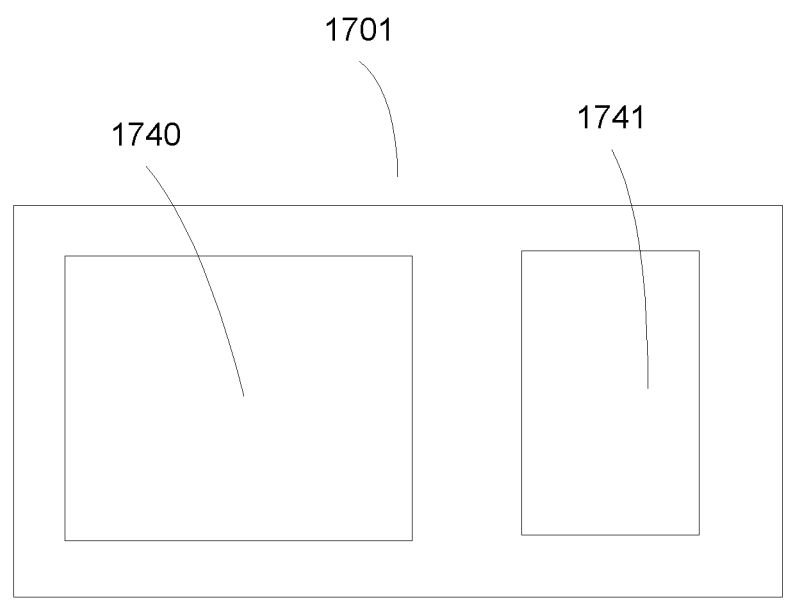

FIGS. 17A and 17B is a representation of a preferred embodiment illustrating a handheld smart placer or RFID placement device for the RFID system. FIG. 17A teaches to a side view of a handheld smart placer or RFID placement device 1701. The smart placer or RFID placement device may be designed similarly to a gun type RFID scanner or scanner of which is a common design for scanners and readers, wherein the device is designed to be handheld. However, it may be appreciated that the smart placer or RFID placement device may be structured to be non-handheld or of a different design. It is also noted that the smart placer or RFID placement device may also be a software on an existing device, such as a mobile device, wherein the device already has RFID reader elements and an RFID encoding ability and storage, or the reader may be a separate device than the encoder and placer. As well as this, smart placer or RFID placement device may not be handheld and may be incorporated into an assembly line or other manufacturing or processing device. The preferred embodiment handheld smart placer or RFID placement device 1701 may have at least one RFID reader/transmitter/encoder 1702 of which may scan for RFID elements, such as the far-field antenna integrated in the object previously and measure, read or otherwise determine the proper placement for the RFID IC with near-field antenna based on any type of effect such as interference caused by the substrate, object, product or otherwise such as passive interference, active interference or field attenuation or frequency shifts in respect to the far-field antenna and intended use. The device may then provide for a display as seen in FIG. 17B or may have other indicator lights 1702 or other indicators, such as a green, yellow, and red light of which may indicate to the user while reading for RFID's the proper placement of the RFID IC with near-field antenna, to couple with the far-field antenna already incorporated in the device and taking into account any type of effect such as interference caused by the substrate, object, product or otherwise such as passive interference, active interference or field attenuation or frequency shifts in respect to the far-field antenna, as well as intended use. The user, may then actuate, such as button or trigger 1742 or otherwise instruct the smart placer or RFID placement device to encode and present an RFID IC with near-field antenna, of which may be presented out of for example, the forward facing side of the device such as port 1703, and to be placed on the device. It is also noted the encoding and presentation may be done automatically when the proper conditions are met. The RFID IC with near-field antenna may be of any type, and may have a sticky or adhesive backing, or may be fastened or placed on the object through any method and may dispense through any method. The smart placer or RFID placement device may have a storage capability to store the RFID IC with near-field antenna in a sufficient capacity for use and may present the RFID IC with near-field antenna encoded and separated from a roll or internal or external storage area.

FIG. 17B presents a top view of the smart placer or RFID placement device 1701, of which demonstrates a display 1740 and input device 1741, of which the display may present information, such as data, encoding information, RFID locations and type, etc. to the user to aid in the placement of the RFID IC with near-field antenna. This may especially be to inform the user the proper placement of the RFID IC with near-field antenna. With the display and input device, such as a keyboard or number pad, the user may edit or select the data to be encoded. Data to be encoded may also be captured from a networked location or any location, for example such as the smart placer or RFID placement device connecting to a wireless network, onboard memory storage of the smart placer or RFID placement device, or removable memory in the smart placer or RFID placement device, such as a memory card.

A number of embodiments have been described. Nevertheless, it will be understood that various modifications may be made without departing from the spirit and scope of the claimed invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It may be appreciated that the various systems, methods, and apparatus disclosed herein may be also be embodied in a machine-readable medium and/or a machine accessible medium compatible with a data processing system (e.g., a computer system), and/or may be performed in any order.

The structures and modules in the figures may be shown as distinct and communicating with only a few specific structures and not others. The structures may be merged with each other, may perform overlapping functions, and may communicate with other structures not shown to be connected in the figures. Accordingly, the specification and/or drawings may be regarded in an illustrative rather than a restrictive sense.

What is claimed is:

1. A method comprising:
   providing an object, wherein:
      an RFID far-field antenna is integrated in the object,
   providing an RFID placement device, and
   placing an RFID IC with a near-field antenna on the object with the RFID placement device, wherein:
      the RFID IC with the near-field antenna interacts with the RFID far-field antenna, and wherein:
      the RFID placement device reads or measures a response from the RFID IC and determines an optimum position or location to place the RFID IC with the near-field antenna.

2. A method as in claim 1, wherein prior to providing the object:
   the RFID far-field antenna is manufactured with the object as to become a part of the object itself.

3. A method as in claim 1, wherein:
the RFID placement device is integrated into an existing processing or manufacturing machine, wherein the machine is able to perform the function of the RFID placement device, in addition to the existing processing or manufacturing capability.

4. A method as in claim 1, wherein prior to placing the RFIC IC with the near-field antenna, the RFID placement device:
scans for RFID elements, specifically:
scanning for the RFID far-field antenna integrated in the object, and
determining the RFID far-field antenna position and location.

5. A method as in claim 1, wherein:
the response comprises field attenuation or frequency shift caused by the object and the optimum position or location to place the RFID IC with the near-field antenna is based on proper performance and interaction.

6. A method as in claim 1, wherein:
the RFID placement device indicates to a user the optimum position or location to place the RFID IC with the near-field antenna.

7. A method as in claim 1, wherein:
the field attenuation is due the distance between the RFID with the near-field antenna and the RFID far-field antenna and the frequency shift is due to a dielectric property of the object.

8. A method as in claim 1, wherein:
the proper performance or interaction comprises a communication ability between the RFID IC with the near-field antenna and the RFID far-field antenna integrated in the object.

9. A method as in claim 1, wherein prior to placing the RFIC IC with the near-field antenna:
the RFID placement device transcodes or writes data to the RFID IC with the near-field antenna based on the read RFID far-field antenna and corresponding object, and presents the RFID IC with the near-field antenna to be placed.

10. A method as in claim 1, wherein:
the RFID IC with the near-field antenna and the RFID far-field antenna are inductively coupled, magnetically coupling or capacitively coupled.

11. A method as in claim 1, wherein after production:
the RFID IC with the near-field antenna interacts with the RFID far-field antenna integrated in the object to send and receive data with other RFID devices in a far-field.

12. An RFID placement system comprising
an RFID placement device, wherein:
the RFID placement device presents an RFID IC with a near-field antenna to be placed on an object, wherein an RFID far field antenna is integrated in the object,
the RFID IC with the near-field antenna interacts with the RFID far-field antenna integrated in the object, and
the RFID placement device reads or measures field attenuation or frequency shift caused by the object and determines an optimum position or location to place the RFID IC with the near-field antenna for a proper performance or interaction.

13. A system as in claim 12, wherein:
the RFID placement device is handheld.

14. A system as in claim 12:
wherein the RFID placement device has an RFID device that scans and reads for RFID elements,
wherein the RFID placement device
scans for the RFID far-field antenna integrated in the object, and
determines the RFID far-field antenna location.

15. A system as in claim 12, wherein:
the RFID placement device has at least one indicator for a user, wherein the indicator directs the user to position the RFID placement device to place the RFID IC with the near-field antenna in the optimumposition and location on the object.

16. A system as in claim 12, wherein:
the indicator indicates when the RFID placement device, and subsequently the RFID IC with the near-field antenna is in the optimum position and location for the RFID IC with the near-field antenna on the object.

17. A system as in claim 12, wherein:
the proper performance and interaction comprises a communication ability between the RFID IC with the near-field antenna and the RFID far-field antenna integrated in the object.

18. A system as in claim 12, wherein:
the RFID placement device transcodes or writes to the RFID IC with the near-field antenna based on the read RFID far-field antenna, and then presents the RFID IC with the near-field antenna to be placed.

19. A system as in claim 12, wherein:
the RFID placement device has a storage wherein multiple RFID IC with the near-field antennas are stored to be placed.

* * * * *